United States Patent [19]
Berglöw et al.

[11] Patent Number: 5,899,642
[45] Date of Patent: May 4, 1999

[54] MILLING CUTTER AND METHOD OF ASSEMBLY

[75] Inventors: Carl-Erik Berglöw; Sven Eklund, both of Fagersta, Sweden

[73] Assignee: Seco Tools AB, Fagersta, Sweden

[21] Appl. No.: 08/940,021

[22] Filed: Sep. 29, 1997

[30] Foreign Application Priority Data

Sep. 27, 1996 [SE] Sweden .................................. 9603525

[51] Int. Cl.⁶ ...................................................... B23C 5/26
[52] U.S. Cl. .................. 407/40; 407/42; 407/54; 407/113; 407/119; 408/226; 279/8
[58] Field of Search ................................ 407/40, 42, 46, 407/47, 52, 53, 54, 58, 62, 64, 34, 32, 11, 119; 408/56, 59, 202, 226; 279/8

[56] References Cited

U.S. PATENT DOCUMENTS

| 1,746,716 | 2/1930 | Sasse .................................... 408/226 X |
| 3,139,800 | 7/1964 | Clarkson et al. ........................ 279/8 X |
| 4,799,838 | 1/1989 | Kubo et al. .............................. 279/8 X |
| 4,929,131 | 5/1990 | Allemann ................................ 279/8 X |
| 4,958,965 | 9/1990 | Strand et al. ............................ 408/226 |
| 5,110,349 | 5/1992 | Westergren et al. ................. 407/119 X |
| 5,598,751 | 2/1997 | Ochayon et al. .................... 408/226 X |

FOREIGN PATENT DOCUMENTS

57-189713  12/1982  Japan .

*Primary Examiner*—Andrea L. Pitts
*Assistant Examiner*—Henry W. H. Tsai
*Attorney, Agent, or Firm*—Burns, Doane, Swecker & Mathis, L.L.P.

[57] ABSTRACT

An end mill includes a shank, a pull rod having a first end connected to a front end of the shank, and a second end connected to an end mill head. The end mill head has a centering surface engageable with a centering surface formed on either the pull rod or shank. The end mill head includes a radially extending abutment surface engageable with a radial abutment surface formed on the shank.

7 Claims, 7 Drawing Sheets

MILLING CUTTER AND METHOD OF ASSEMBLY

BACKGROUND OF THE INVENTION

1. Field of the Invention

The present invention relates to an end mill comprising an end mill head having a pull rod secured thereto and a shank having a hole into which the pull rod is fitted, said end mill head having a cutting edge and said end mill having a center axis. The invention further relates to an end mill head and methods for securing an end mill head to a shank.

2. Prior Art

A previously known end mill with a detachable head is disclosed in Japanese Patent Document 57-189713. The known tool includes a neck portion which is integral with the end mill head, which neck portion constitutes a potential breakage area for the tool. Another problem with such prior art is that it has been found unstable in some high speed applications, due to the lack of support at radially outer surfaces. In addition unnecessarily expensive tool material is used in the neck portion.

OBJECTS OF THE INVENTION

An object of the present invention is to provide a ball nose end mill in which performance and useful life are improved.

Another object of the present invention is to provide a ball nose end mill which has an extremely good stability such that a machined surface can be Obtained which is substantially free from chatter marks.

Still another object of the present invention is to provide an easily mountable ball nose end mill.

Still another object of the present invention is to provide a ball nose end mill which due to its configuration saves expensive cutting tool material.

SUMMARY OF THE INVENTION

The present invention relates to an end mill comprising a shank having a hole at-its forward end; a pull rod mounted in the hole, and an end mill head mounted on a front end of the pull rod. The end mill head has cutting edge means and fastening means releasably fastening the end mill head to the pull rod. The end mill defines a center axis of rotation, and the end mill head is formed of injection molded material. The fastening means and cutting edge means are formed as one integral piece with the end mill head. The end mill head and the shank form mutually abutting abutment surfaces for limiting an axial convergence of the end mill head and shank. The abutment surfaces extend generally perpendicular to the center axis.

The present invention also relates to the end mill head per se, and to method of assembling an end mill.

DESCRIPTION OF THE DRAWINGS

The present invention will be explained in more detail by referring to the accompanying drawings, wherein.

DETAILED DESCRIPTION OF PREFERRED EMBODIMENTS OF THE INVENTION

Figure 1A:
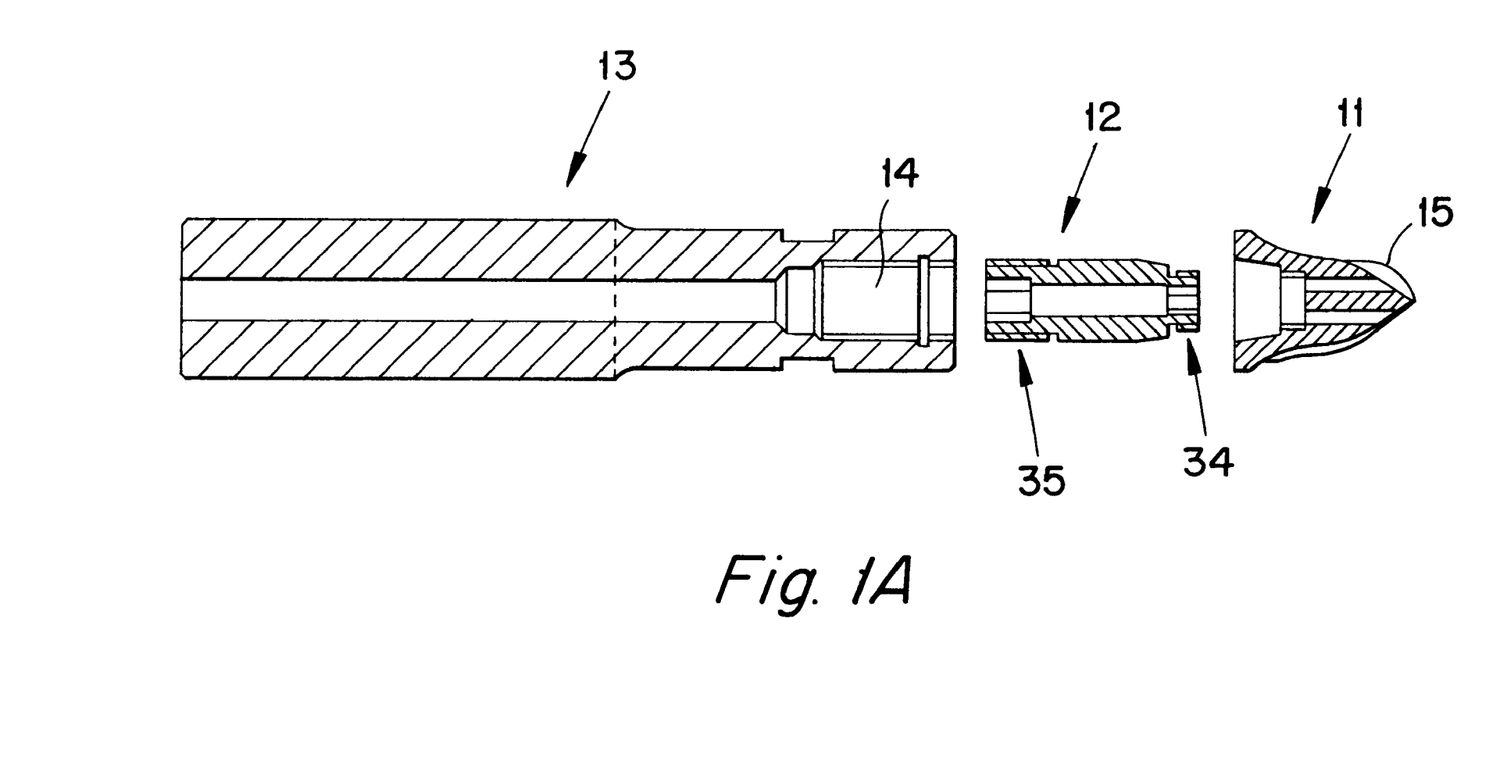
FIG. 1A is an exploded and sectioned side view showing an embodiment of a ball end mill according to the present invention.
Figure 1B:
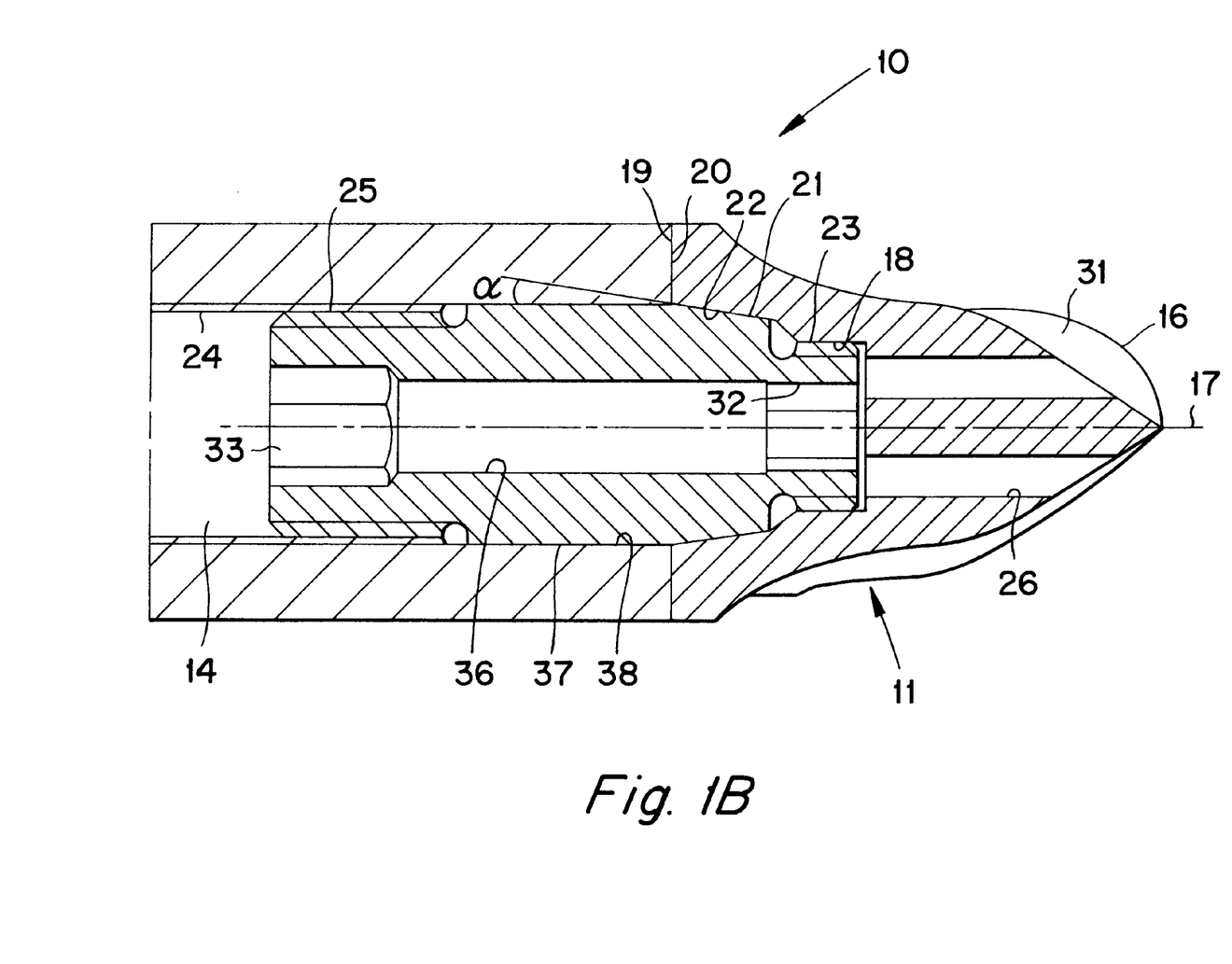
FIG. 1B is a magnified side view showing the ball end mill of FIG. 1A as assembled.
Figure 2:
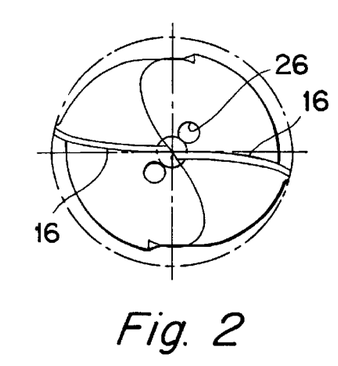
FIG. 2 is a top view of an end mill head according to the present invention.

FIGS. 1A and 1B show an embodiment of a detachable ball nose end mill 10 according to the present invention. The end mill 10 comprises a mill head 11, a pull rod or screw 12 and a shank 13. The pull rod 12 is threaded into the mill head 11 and the pull rod is connected to the shank 13. The shank is preferably held in a rotatable spindle in a milling or drilling machine, not shown. The shank 13 has a hole 14 into which the pull rod 12 is fitted. The end mill head 11 has cutting edge means 15, such as two identical cutting edges 16 extending from at least the outermost point of the head towards the center axis 17 of the tool. The cutting edge means 15 may alternatively include three or four identical cutting edges 16. The cutting edges 16 preferably meet in the vicinity of the center axis 17.

Figure 3A:
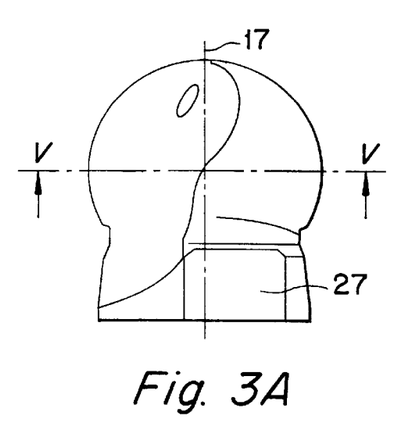
FIGS. 3A and 3B are side views of the and mill head.
Figure 3B:
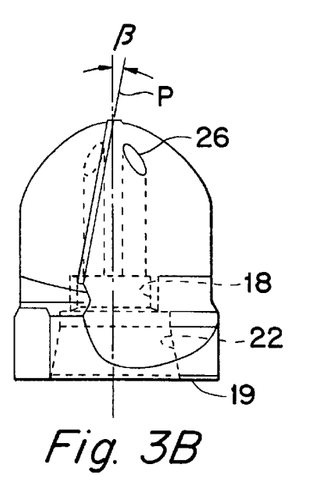
Figure 4:
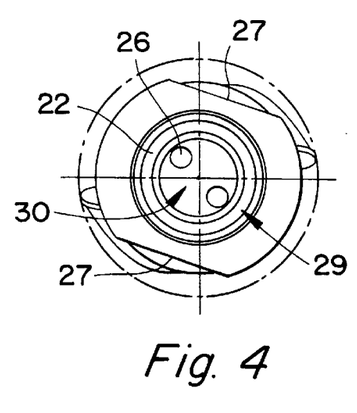
FIG. 4 is a bottom view of a lower side of the end mill head.
Figure 5:
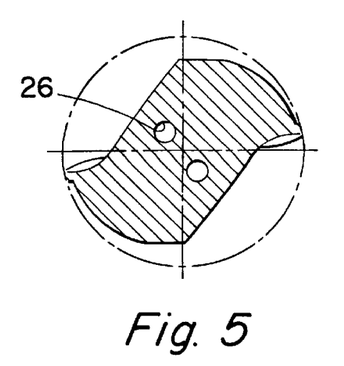
FIG. 5 is a cross-sectional view of the end mill head taken along line V—V in FIG. 3A.
Figure 6:
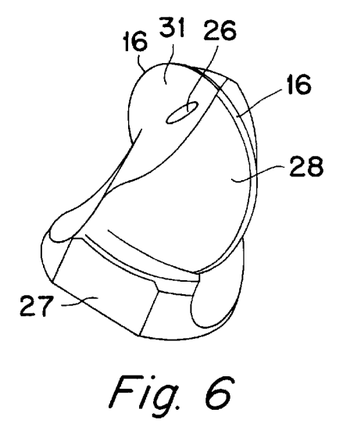
FIG. 6 is a perspective view of the end mill head.

The end mill head and the shank comprise cooperating abutment surfaces 19 and 20. The abutment surfaces are preferably planar and, extend generally perpendicularly to the center axis 17 of the end mill. Preferably the cutting edge means 15 follow a path which is larger than 180° so as to allow outcopying during upwardly directed feed. The path is preferably circular and its largest diameter is larger than the diameter of the abutment surface 19 and larger than the diameter of the shank. The largest diameter of the abutment surface 19 of the mill head and the outer diameter of the abutment surface 20 of the shank are substantially identical. Each cutting edge 16 lies in a plane P which forms an acute angle β with the center axis 17, when seen in a view as shown in FIG. 3B. The angle β is 5 to 15 degrees, preferably about 10 degrees.

The pull rod 12 is separable from the end mill head by means of threads 18 and/or bayonet means, the latter not shown. The end mill head does not extend axially rearwardly beyond the plane of surfaces 19 and 20. The pull rod and the end mill head comprise conical cooperating centering surfaces 21 and 22. The centering surfaces 21 and 22 taper at an acute angle α relative to the center axis 17 towards an axially forward free end 34 of the pull rod, FIG. 1B. The angle α is from 1 to 20°, Preferably 5 to 10°.

The end mill head is made from material harder than the material of the pull rod. The end mill head is manufactured by mixing powder of sintered hard alloy or cermet with an organic binder such as plastics and forming the mixture into pellets or granulates, molding the pellets or granulates by an injection molding process and sintering the obtained product at a temperature of 1300 to 1500° C. The pull rod is preferably made from steel, which is relatively inexpensive.

The free ends of the mill rod comprise fastening means, such as threads 23 and 25 and/or bayonet means, for engagement with corresponding fastening means 18 and 24, respectively, in the end mill head and in the shank. The end mill head has channels 26 for promoting pressurized medium, such as air or liquid, to remove chips, and the medium is supplied from the tool holder (not shown). The end mill head comprises external key grip means 27 for receiving a tool for effecting mounting and dismounting.

The end mill head 11 for cutting material during its revolution about the center axis 17 further comprises clearance means 28, a first recess 29 having the centering means 22 therein, and a second recess 30 having the fastening means 18 therein. At least two of the substantially parallel flushing channels 26 are provided in the end mill head, extending from the second recess 30 and terminating in chip flutes or rake faces 31 of the end mill head. The recesses 29, 30 make a penetrated blind hole, i.e., a hole With a certain depth to which the flushing channels 26 connect. Such blind hole has a substantially decreasing cross-sectional area in a direction towards the cutting edge means 15.

The elongated pull rod to be used in the rotatable ball nose end mill further comprises key grip means 32 and 33, such as hexagon wrench holes for Allen keys, at the first free end 34 and a second free end 35, respectively. The centering surface 21 is provided closer to the first free end 34 than to the second free end 35 of the pull rod. The diameter of the first free end 34 is smaller than the diameter of the second free end 35. A longitudinally extending hole 36 is provided in the pull rod, the hole extending from one free end to another for the promotion of pressurized medium, such as liquid or air. Medium to remove chips is supplied through the hole 36 and the flush channels.

Now, a mounting and dismounting method for the detachable ball nose end mill will be described below primarily in connection with FIGS. 1A and 1B. The pull rod 12 is mounted by inserting the rod into the hole 14 of the shank 13 and by rotating the rod with a key, not shown, in the grip 32 or 33 to a predetermined depth. The threads 25 of the rod will then engage the threads 24 of the shank. The portions 37 and 38 are manufactured with small tolerances so as to provide a slip fit and to minimize relative radial movement. Preferably at least one of the threads 24 and 25 is provided with a locking medium, such as plastics, so as to increase the resistance against unscrewing.

The end mill head 11 is then placed over the free end 34 of the rod and is rotated such that the engagement of threads 18 and 23 draw the head axially towards the shank until the centering surfaces 21 and 22 engage and center the mill head. Further rotation of the head, by means of a wrench acting externally on the key grip means 27, will result in rotation also of the rod 12 until the abutment surfaces 19 and 20 come into contact and stop further axial movement of rod and head.

In an alternative mounting procedure the end mill head and the pull rod are joined together via threads 18, 23 such that the centering surfaces 21, 22 engage and then the rod and the head are threaded as a unit into the shank hole 14, until the abutment surfaces 19, 20 engage and stop further axial movement of rod and head.

The above-described threads are provided such that the forces acting on the cutting edge means 15 will tend to further tighten them if not already tightened. This will also be the case if an alternative fastening means, for example a bayonet coupling, is used.

When the cutting edge means 15 has become worn and the head 11 shall be replaced, then the above procedure concerning the head, is reversed. Since the threads 24 and 25 are more tightly interconnected due to the locking medium, these threads will not unscrew during unscrewing the head. Therefore a new head may be mounted without loosening the rod 12.

Figure 7A:
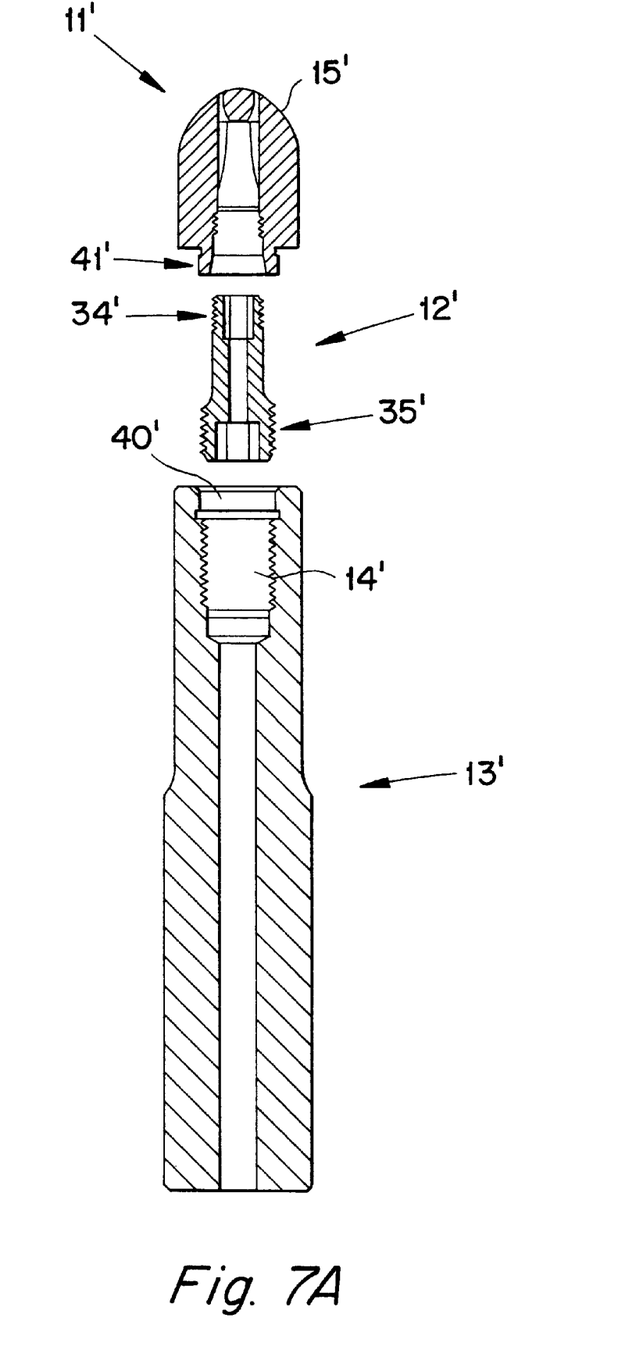
FIG. 7A is an exploded and sectioned side view of an alternative embodiment of a ball end mill according to the present invention.

Referring now to FIGS. 7A through 13, an alternative embodiment of a tool according to the present invention will be described. It is understood that like numerals depict like details as described in connection with the previous embodiment. FIGS. 7A, 7B show an embodiment of a detachable ball nose end mill 10 comprising a mill head 11', a pull rod or screw 12' and a shank 13'. The pull rod 12' is screwed into the mill head 11' and the pull rod is further connected to the shank 13'. The shank 13' has a hole 14' into which the pull rod 12' is fitted. The end mill head 11' has cutting edge means 15' such as two identical cutting edges 16' extending at least from the outermost point of the head towards the center axis 17' of the tool. The cutting edge means 15' may alternatively include three or four identical cutting edges. The cutting edges 16' preferably meet in the vicinity of the center axis 17'.

Figure 9A:
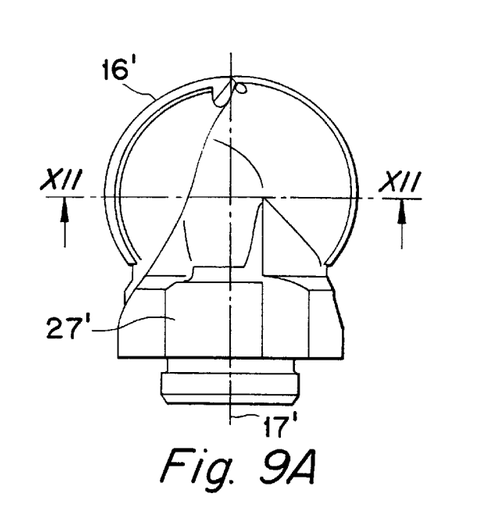
FIGS. 9A and 9B are side views of the alternative end mill head.
Figure 9B:
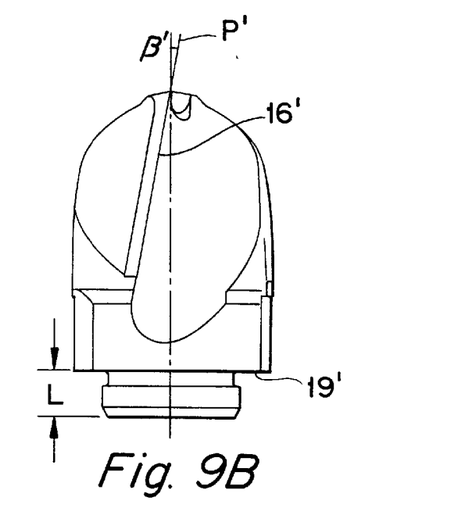
Figure 10:
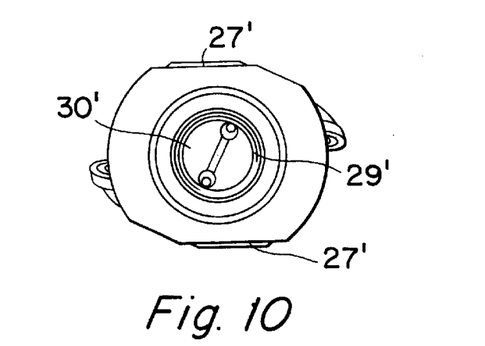
FIG. 10 is a bottom view of a lower side of the alternative end mill head.
Figure 11:
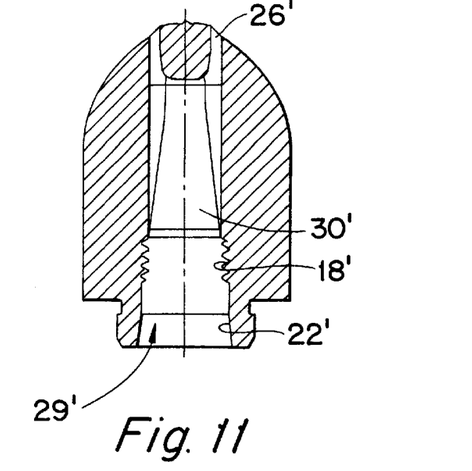
FIG. 11 is a cross-sectional view of the alternative end mill head.
Figure 12:
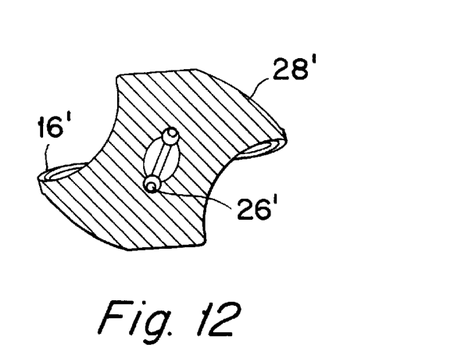
FIG. 12 is a cross-sectional view of the alternative end mill head taken along line XII—XII in FIG. 11A.
Figure 13:
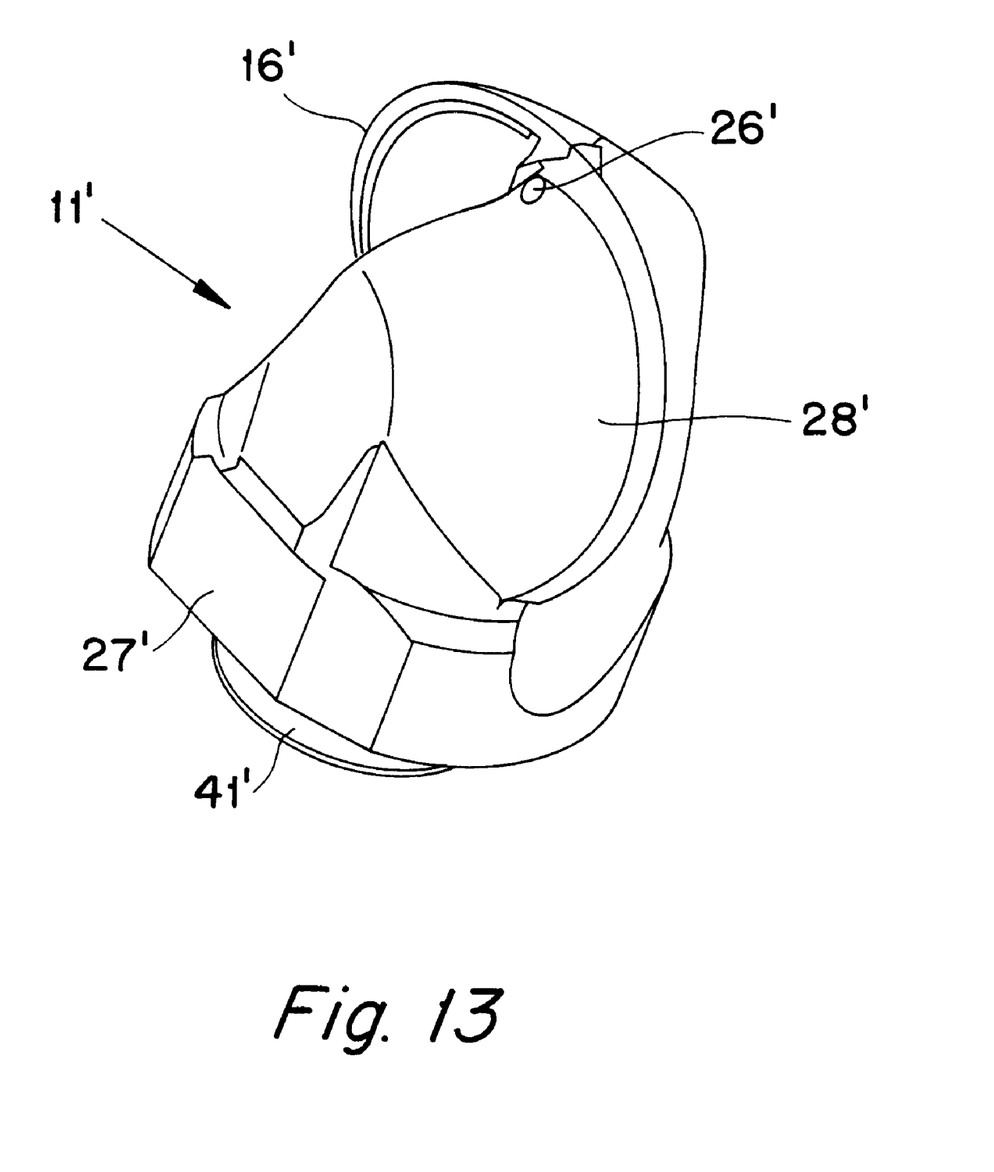
FIG. 13 is a perspective view of the alternative end mill head.

The end mill head and the shank comprise cooperating abutment surfaces 19' and 20'. The abutment surfaces are preferably planar and extend generally perpendicularly to the center axis 17' of the of the end mill. Preferably the cutting edge means 15' follow a path, which is larger than 180° so as to allow outcopying during upwardly directed feed. The path is preferably circular and its largest diameter is larger than the diameter of the abutment surface 19' and the diameter of the shank. The largest diameter of the abutment surface 19' of the mill head and the outer diameter of the abutment surface 20' of the shank are substantially equal. Each cutting edge 16' lies in a plane P' which forms an acute angle β with the center axis 17', when seen in a view as shown in FIG. 9B. The angle is 5 to 15°, preferably about 10°.

The pull rod 12' is separable from the end mill head by means of threads 18' or bayonet means, the latter not shown. The end mill head extends partially axially rearwards of the plane of the surfaces 19' and 20'. The shank and the end mill head comprise substantially cylindrical cooperating centering surfaces 21' and 22', respectively. The centering surface 21' of the shank is located in a recess 40' in the forward free end of the shank. The centering surface 22', of the mill head is located externally on the projection 41' extending rearwardly of the abutment surfaces 19', by a distance L. The centering surfaces 21' and 22' extend substantially parallel to the center axis 17'.

The end mill head is made from material harder than the material of the pull rod. The threads 25' of the rod will then engage the threads 24' of the shank. The end mill head is manufactured by mixing powder of sintered hard alloy or cermet with an organic binder such as plastics and forming the mixture into pellets or granulates, molding the pellets or granulates according to an injection molding process and sintering the obtained product at a temperature of 1300 to 1500° C. The pull rod is preferably made from steel, which is relatively inexpensive.

The free ends of the pull rod comprise fastening means, such as threads 23' and 25' and/or bayonet means, for engagement with corresponding fastening means 18' and 24', respectively, in the end mill head and in the shank. The end mill head has channels 26', for conducting pressurized medium, such as air or liquid, to remove chips and the medium is supplied from the tool holder, not shown. The end mill head comprises external key grip means 27' for mounting and dismounting.

The end mill head 11' for cutting material during its revolution about the center axis 17' further comprises clearance means 28', a first recess 29', having centering means 22' therein, and a second recess 30, having fastening means 18' therein. At least two flushing channels 26', are provided in the end mill head, extending from the second recess 30' and terminating in chip flutes or rake faces 31' of the end mill head.

The elongated pull rod to be used in the rotatable ball nose end mill further comprises key grip means, such as hexagon wrench holes for Allen keys, at the first free end 34', and a second free end 35', respectively. The diameter of the first free end 34' is smaller than the diameter of the second free end 35. A longitudinally extending hole 36' is provided in the pull rod, said hole extending from one free end to another for conducting pressurized medium, such as liquid or air. Medium to remove chips is supplied through the hole 36' and the flush holes 26'.

Figure 7B:
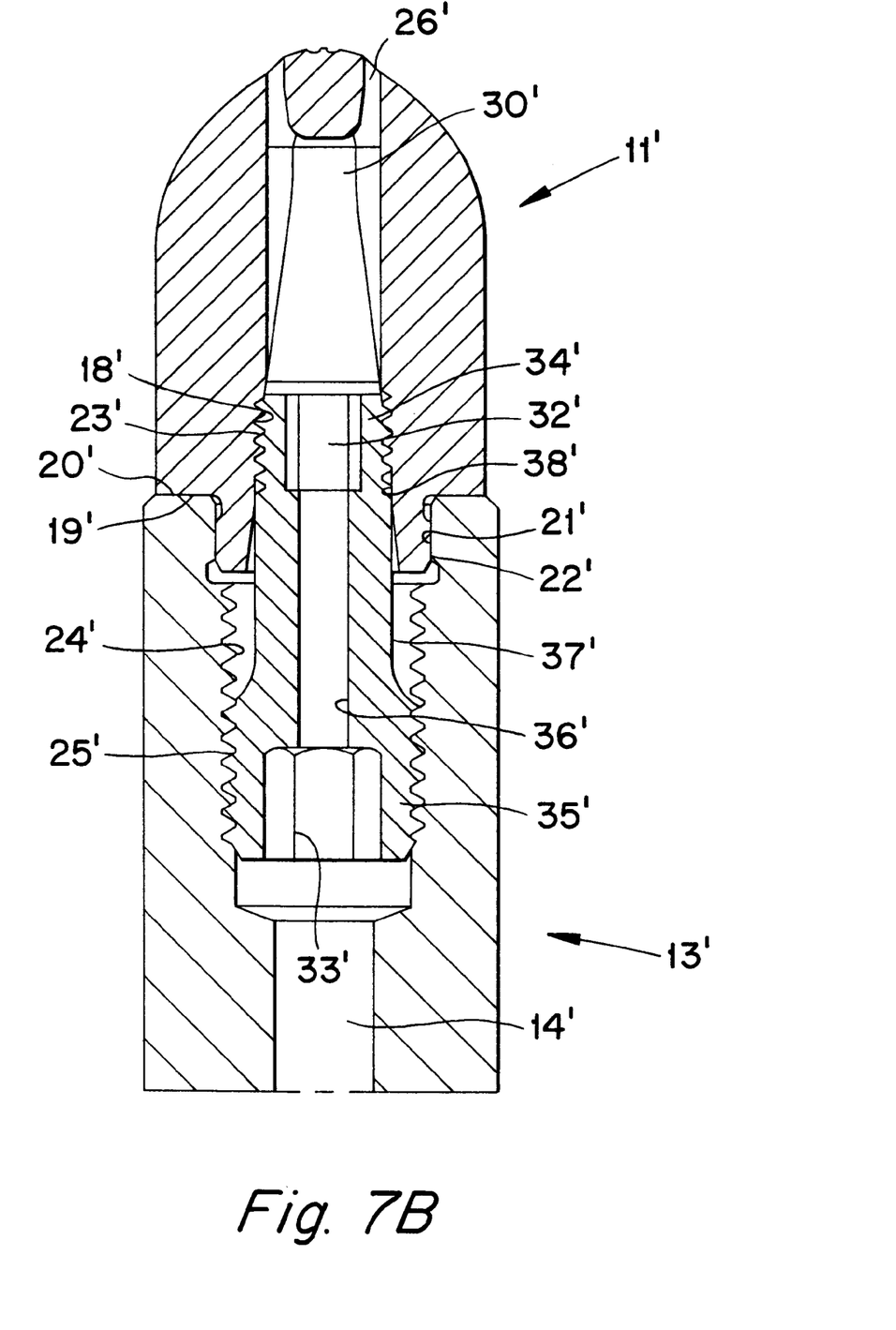
FIG. 7B is a magnified side view showing the ball end mill of FIG. 7A as assembled.
Figure 8:
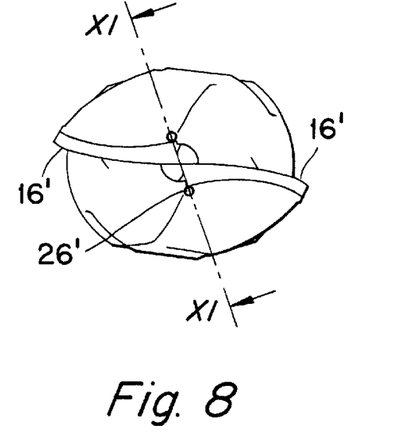
FIG. 8 is a top view of an alternative end mill head according to the present invention.

Now, a mounting and dismounting method for the detachable ball nose end mill will be described below primarily in connection with FIGS. 7A and 7B. The pull rod 12' is mounted by inserting it into the hole 14' of the shank 13' and by rotating the rod with a key (not shown), from the front or from the rear into the grip means 32' or 33', respectively, to a predetermined depth. The threads 25', of the rod will then engage the threads 24' of threads shank.

The end mill head 11' is then placed over the free end 34' of the rod and is rotated such that the engagement of threads 18' and 23' draws the head axially towards the shank until the centering surfaces 21' and 22' engage and center the mill head. The surfaces 21' and 22' are manufactured with small tolerances so as to provide a slip fit and to minimize relative radial movement. Preferably at least one of the threads 24' and 25' is provided with a locking medium, such as plastics, so as to increase the resistance against unscrewing. Further rotation of the head, by means of a wrench acting externally on the key grip means 27', will result in rotation also of the rod 12' until the abutment surfaces 19' and 20' come in contact and stop further axial movement of rod and head.

The above-described threads are provided such that the forces acting on the cutting edge means 15' will tend to further tighten them if not already tightened. This will also be the case if an alternative fastening means, for example a bayonet coupling, is used.

When the cutting edge means 15' has become worn and the head 11' shall be replaced, then the above procedure concerning the head, is reversed. Since the threads 24' and 25' are more tightly interconnected due to the locking medium, these threads will not unscrew during unscrewing the head. Therefore a new head may be mounted without loosening the rod 12'.

An alternative, preferable, method for mounting and dismounting the detachable ball nose end mill is hereinafter described. First, the head and the pull rod are joined together via the threads 18' and 23' preferably until the rod reaches the bottom of the thread 18'. Then the rod and the head are threaded as a unit into the shank hole 14', until the abutment surfaces 19', 20' engage and stop further axial movement of rod and head.

There are several common features in the two embodiments of a tool according to the present invention, described above. The end mill heads are preferably made of injection molded tungsten carbide and have integrated threads placed axially forwards of the planar abutment surfaces 19, 20 (or 19', 20'). The mill head describes the largest diameter of the entire tool. There is provided only a frictional connection between the mill head and the shank in the rotational direction of the tool. The pull rods are externally threaded at both free ends and they include a central channel for distribution of a flush medium to be transferred to a widened space and successively through the flush channels to the cutting edge area. The pull rod is positioned in the vicinity of the forward end of each shank. There are key grips for rotation of each end mill head during assembling.

The centering principals, however, of the embodiments of the tool according to the present invention differ in that in the first case the centering surfaces are positioned internally in the mill head and externally on the pull rod while tapering forwardly. In the other case, the centering surfaces are positioned externally on the mill head and internally on the shank while being parallel with the rotational axis of the tool.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An end mill comprising: a shank having a hole at its forward end; a pull rod mounted in the hole; an end mill head mounted on a front end of the pull rod; the end mill head having cutting edge means, a center opening into which the pull rod projects, and an internal fastening portion disposed in the center opening and releasably fastening the end mill head to the pull rod; the end mill defining a center axis of rotation; the end mill head formed of injection molded material; the fastening portion and the cutting edge means being formed as one integral piece with the end mill head; the end mill head including a rearwardly facing first surface extending radially outwardly, and the shank including a forwardly facing second surface extending radially outwardly and facing the first surface, the first and second surfaces abutting one another along an interface extending substantially to a radially outermost portion of the end mill head for limiting an axial convergence of the end mill head and shank and for supporting the end mill head; the second surface defining an axially forwardmost portion of the shank; the material from which the end mill head is formed being an injection molded, sintered hard alloy or cermet; the shank forming a first channel portion; the pull rod forming a second channel portion; the end mill forming a third channel portion; the first, second and third channel portions communicating with one another for defining a flush channel that conducts a pressurized fluid to the end mill head.

2. The end mill according to claim 1 wherein the entire end mill head is formed of a material harder than a material from which the pull rod is formed; the pull rod having opposite free ends comprising fastening means respectively engaging the fastening portion of the end mill head and a fastening means of the shank.

3. The end mill according to claim 2 wherein the fastening portion of the end mill head, and the fastening means of the shank, and the pull rod are engageable in response to relative rotation between the end mill head, shank, and pull rod.

4. The end mill according to claim 3 wherein the fastening portion of the end mill head, and the fastening means on the shank, and pull rod all comprise a screw thread.

5. The end mill according to claim 3 wherein the end mill head and pull rod form mutually engaging centering surfaces, the centering surfaces tapering forwardly at an acute angle relative to the center axis, the centering surface of the end mill head surrounding the centering surface of the pull rod.

6. The end mill according to claim 3 wherein the end mill head and the shank form mutually engaging centering surfaces extending substantially parallel to the center axis.

7. The end mill according to claim 1 wherein the cutting edge means comprise a plurality of cutting edges enclosing a path larger than 180° for providing a ball nose end milling the cutting edges meeting substantially at the center axis.

* * * * *